Nov. 11, 1958  P. C. KIYUNA  2,859,900
MEASURING DEVICE
Filed July 31, 1957

INVENTOR
Paul C. Kiyuna
BY
Bacon & Thomas
ATTORNEYS

2,859,900
MEASURING DEVICE

Paul C. Kiyuna, Wahiawa, Oahu, Territory of Hawaii

Application July 31, 1957, Serial No. 675,498

8 Claims. (Cl. 222—424)

This invention relates to measuring devices, and particularly to measuring and dispensing devices adapted to be attached to a tiltable container to measure predetermined quantities of liquid therefrom and dispense the same.

In general the invention comprises a closed chamber formed of resilient material having an outlet spout and an inlet port. The chamber is provided with an attaching means whereby it can be attached to or supported on a tiltable container with the inlet port in communication with an outlet of the container. A valve element, which may be integral with the chamber structure, extends from a resilient side wall of the chamber, in the interior thereof, toward the outlet spout but does not extend far enough to close the spout. Another portion of the valve element overlies and closes the inlet port when the resilient side wall to which the valve element is attached assumes its normal position. Under such conditions any liquid within the chamber may be poured from the outlet. By distorting the resilient wall inwardly, by pressure on the outer surface thereof, the valve member is moved to a position to close the outlet and to uncover the inlet port whereby the container and measuring device may be tilted to admit liquid from the container into the hollow interior of the measuring device until the latter has received a predetermined amount, after which the resilient wall is released to again close the inlet and open the outlet for discharge of the thus-measured quantity of liquid.

It is therefore an object of this invention to provide a measuring and dispensing device adapted to accurately measure successive quantities of a liquid and to dispense the same as desired.

It is a further object of the invention to provide such a measuring device as set forth that is of extremely simple construction, economical to produce, and efficient and dependable in operation.

Figure 1:
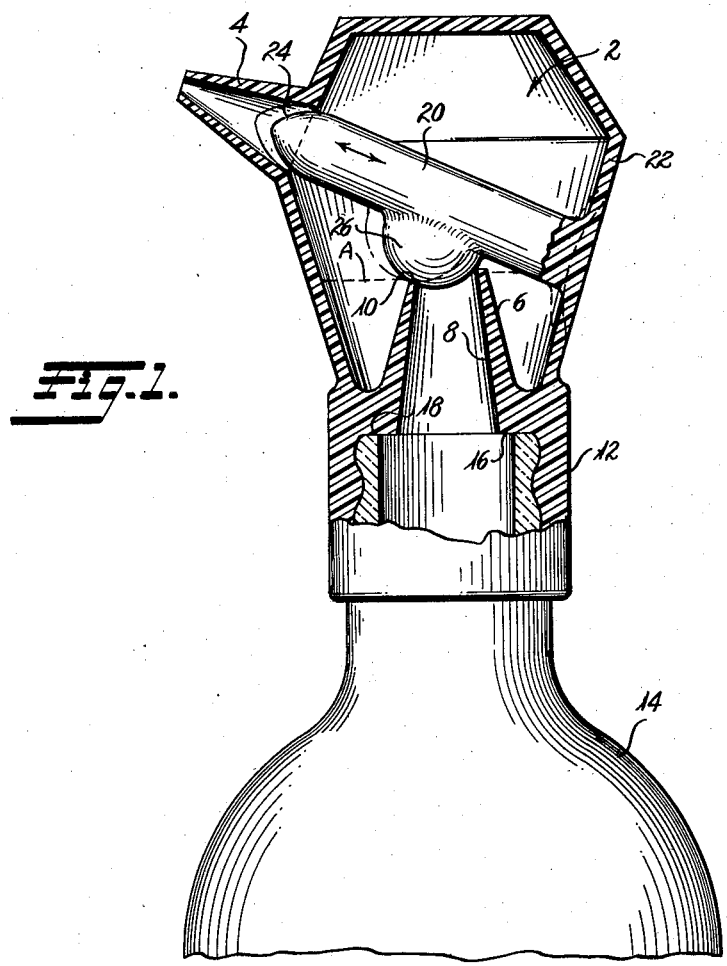
Figure 2:
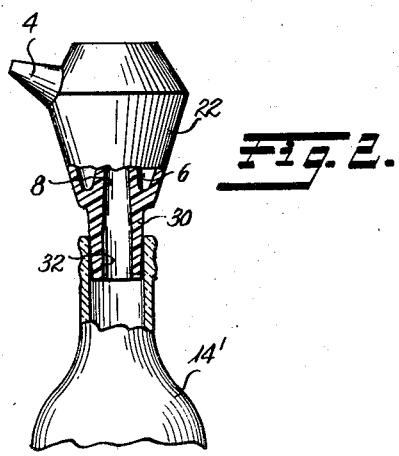

Additional and further objects and advantages will become apparent to those skilled in the art as the description proceeds in connection with the accompanying drawings, wherein:

Fig. 1 is a vertical sectional view through one embodiment of the present invention, with certain parts shown in elevation; and Fig. 2 is a side view of a container having mounted thereon another embodiment of the invention with parts thereof shown in section.

The embodiment of the invention shown in Fig. 1 comprises a unitary structure of suitable resilient material, which may be rubber, elastomeric plastic or the like. Obviously the material must be self-sustaining and substantially inert to the liquid being handled thereby. In accordance with the showing of Fig. 1, the device comprises a plurality of side walls encompassing and defining a substantially closed chamber 2. The chamber 2 is provided with a spout means 4 defining an outlet from the chamber 2 and a tubular structure 6 defining an inlet port and valve seat. The structure 6 is in the form of a hollow truncated cone having a passageway 8 therethrough and terminating in a generally annular upper valve seating surface 10.

Fixed to the means defining the chamber 2 is an attachment element 12 comprising an internally threaded collar portion or cap adapted to be screwed onto the threaded neck of a container or bottle 14. The attachment portion is provided with a shoulder 16 arranged to abut against the upper edge surface 18 of the bottle 14 when the device is firmly threaded to the bottle neck and thus completely seal the bottle. The passageway 8 of the structure 6 communicates with the interior of the bottle neck and constitutes a passageway for conducting liquid from the bottle 14 into the chamber 2, as will be described.

A substantially rigid valve element 20 is secured to a side wall 22 of the chamber 2. As shown, the valve element 20 is integral with the side wall 22 and formed of the same material but of such large section that it constitutes a substantially rigid member even though the material of which it is constructed is basically resilient. The valve element 20 extends from the wall 22 in a direction toward the outlet spout 4 and terminates with its tip in the spout 4 but not closing the same (as shown in full line in Fig. 1) to leave a space or opening between the chamber 2 and the outlet spout 4 so that any liquid material within the chamber may be poured from the spout 4. The tip portion of the valve element 20 is generally tapered, as at 24, and is of a maximum diameter greater than the adjacent portion of the spout 4. Thus, when the wall 22 is flexed inwardly to the position shown in dotted lines, the tapered end of the valve element 20 is projected completely into the spout 4 in sealing relation thereto. The top portion of valve element 20 extends partially into spout 4, in the full line position, to prevent accidental displacement of the valve element from alignment with the outlet 4.

The valve element 20 is further provided with a generally hemispherical projection 26 on its lower side, which projection is so positioned and proportioned as to seat on the annular seat 10 and seal the passageway 8 when the wall 22 is in its normal or full line position. While the projection 26 is shown and described as being substantially hemispherical, it is to be understood that such form is not essential as long as the projection is provided with a surface capable of seating on the annular edge surface 10 in sealing relation thereto. If desired, the parts may be so proportioned that the upper side of the tip of valve element 20 bears against the upper side of the outlet opening even with the parts in the full line position so as to insure firm seating of projection 26 on valve seat 10.

The full line showing of Fig. 1 shows the device in its normal condition and constitutes the condition in which the apparatus will be left during periods of non-use. When it is desired to measure and dispense a predetermined quantity of liquid from the container 14, the side wall 20 is first depressed inwardly to the dotted line position to seal the outlet 4 and open the inlet to chamber 2. While the wall 22 is held in such depressed condition, the container is tilted sufficiently to cause flow of liquid therefrom through the passageway 8 and into chamber 2. Obviously, only a predetermined volume of liquid will enter the chamber 2 since it is of limited volumetric capacity and a certain amount of air will be trapped therein preventing the entry of additional liquid. The parts are so designed and proportioned that the maximum quantity of liquid that will enter the chamber 2 under the described conditions is the desired quantity of liquid to be dispensed. After the chamber 2 has received the desired quantity of liquid, as described, the side wall 22 is released and, due to its resilience, will return to the full line position, whereupon the outlet 4 is reopened and the inlet to the chamber is closed. If the apparatus is in a tilted position at that time the measured liquid will immediately flow from the outlet 4, unless that outlet is uppermost, in which case the liquid will not be dispensed until the apparatus is tilted to position the outlet at substantially the bottom thereof. When operated in the manner described, the device will measure and dispense a maximum quantity of liquid. However, if the maximum quantity is permitted to flow into the chamber 2 as described above and the container 14 is then restored to the upright position shown in Fig. 1 while the side wall 22 is held in the dotted line position, some of the liquid will flow back into the bottle 14 until the level thereof in chamber 2 is at the top of the valve seat portion 6, as indicated by line A. Thus, a minimum quantity of the liquid may be accurately measured. After the liquid in chamber 2 has reached the level of the surface 10, the wall 22 may be released to again seal the inlet and open outlet 4, whereupon the minimum quantity described may be poured therefrom.

Referring now to Fig. 2, the container or bottle 14' is not provided with external threads and could thus not be employed with the embodiment shown in Fig. 1. The apparatus of the present invention, however, is adaptable to such a bottle by providing a hollow stopper portion 30 thereon instead of the internally threaded cap element 12 of Fig. 1. The hollow stopper 30 is preferably of tapered outer configuration whereby it may be pressed securely into the bottle neck and is provided with a central passage 32 communicating with the interior of the bottle and also with the passageway 8 defining the inlet of the flexible chamber 2. The valve element in the embodiment of Fig. 2 may be an exact duplicate of the valve element 20 of Fig. 1 or any equivalent thereof. The modification of Fig. 2 involves only a different means for supporting the measuring device on a bottle or similar container.

In both of the embodiments the devices are shown as being of one-piece or integral construction. It is to be understood, however, that the device may be fabricated by forming different portions thereof separately and later assembling and joining them in any suitable manner. It is also contemplated that different portions may be formed of different materials.

While a limited number of embodiments of the invention are shown and described herein, it is to be understood that the disclosed embodiments are merely illustrative of preferred forms. Other embodiments are contemplated within the scope of the invention as defined by the appended claims.

I claim:

1. A measuring device comprising, means defining a closed chamber and provided with means defining an inlet port and means defining an outlet port in a side wall of said chamber, means for mounting said device on a tiltable container with said inlet port in communication with the interior of said container, said chamber having a resilient side wall opposite said outlet port, a valve member secured to said resilient wall and extending toward but normally spaced from said outlet port, said valve member having a closure portion slidably overlying and normally closing said inlet port whereby said resilient wall may be flexed inwardly to move said valve member into closing relation to said outlet port while opening said inlet port.

2. A measuring device as set forth in claim 1 wherein said outlet port is defined by a tubular spout having an outwardly tapered opening therethrough, said valve member having an end portion receivable in said tapered opening for closing and sealing the same.

3. A measuring device as defined in claim 1 wherein said inlet port is defined by a tubular projection extending inwardly of said chamber and terminating adjacent a side of said valve member, said valve member having a protuberance on said side normally seated on and closing the open end of said tubular projection.

4. A measuring device as defined in claim 1 wherein the means defining said inlet and outlet ports is a resiliently deformable material.

5. A measuring device as defined in claim 1 wherein said means for mounting said device comprises an attaching portion engageable with the open end portion of a bottle neck.

6. A measuring device as defined in claim 5 wherein said attaching portion comprises an internally threaded cap.

7. A measuring device as defined in claim 5 wherein said attaching portion comprises a tapered tubular stopper insertable in a bottle neck.

8. A measuring device as defined in claim 1 wherein said means defining said inlet port comprises a tubular structure projecting into said chamber, said portion of said valve member normally closing the innermost end of said tubular structure.

References Cited in the file of this patent

UNITED STATES PATENTS

| | | |
|---|---|---|
| 1,992,067 | Gunn | Feb. 19, 1935 |
| 2,219,604 | Trotter | Oct. 29, 1940 |
| 2,334,032 | Rhodes | Nov. 9, 1943 |
| 2,543,850 | Henrickson | Mar. 6, 1951 |